Jan. 1, 1963 W. M. HARCUM 3,071,337

AUTOMATIC PILOT

Filed April 14, 1958 9 Sheets-Sheet 1

INVENTOR.
*William M. Harcum*
BY John C. McGregor &
James C. Eisenman
ATTORNEYS

AUTOMATIC PILOT

Filed April 14, 1958 9 Sheets-Sheet 2

INVENTOR.
William M. Harcum
BY John C. McGregor
James C. Eisenman
ATTORNEYS

INVENTOR.
William M. Harcum
BY John C. McGregor
James C. Eisenman
ATTORNEYS

Jan. 1, 1963 W. M. HARCUM 3,071,337
AUTOMATIC PILOT
Filed April 14, 1958 9 Sheets-Sheet 4

INVENTOR.
William M. Harcum
BY John C. McGregor &
James G. Eisenman
ATTORNEYS

INVENTOR.
William M. Harcum
BY John G. Mc Gregor &
James C. Eisenman
ATTORNEYS

INVENTOR.
William M. Harcum
BY John C. McGregor
James C. Eisenman
ATTORNEYS

Jan. 1, 1963 W. M. HARCUM 3,071,337

AUTOMATIC PILOT

Filed April 14, 1958 9 Sheets-Sheet 7

INVENTOR.

William M. Harcum

BY John C. McGregor

James C. Eisenman

ATTORNEYS

AUTOMATIC PILOT

Filed April 14, 1958

INVENTOR.

William M. Harcum

BY John G. McSegue & James A. Eisenman

ATTORNEYS

Jan. 1, 1963 W. M. HARCUM 3,071,337

AUTOMATIC PILOT

Filed April 14, 1958

9 Sheets-Sheet 9

INVENTOR.

William M. Harcum

BY John C. McGregor

James C. Eselmann

ATTORNEYS

United States Patent Office 3,071,337

Patented Jan. 1, 1963

3,071,337

AUTOMATIC PILOT

William M. Harcum, Ambler, Pa., assignor to Aircraft Products Co., Bridgeport, Pa., a corporation of Pennsylvania Filed Apr. 14, 1958, Ser. No. 728,158
18 Claims. (Cl. 244—78)

This invention relates to automatic pilots for dirigible craft and more particularly to automatic pilots capable of affording positive control in as many as three directions.

Automatic pilot instruments have been developed for flying and assisting in the flying of aircraft and other dirigible vehicles. These instruments utilize power stages to drive the control surfaces of the vehicles, the power stages being operated through control stages responsive to input or control signals of an extremely low magnitude. The control signals are derived from sensing instruments such as gyroscopes oriented in vertical and horizonal planes, finger actuated controls and the like, and the energy to actuate the system can be electrical or pneumatic or various combinations of the two. Generally speaking, automatic pilot equipment is expensive, bulky, intricate and heavy. Moreover, critical and often complex power requirements, follow-up linkages, and form-factors and geometry of the many component parts all contribute to difficult and costly installation, particularly in planes below the heavy military and commercial levels. It follows that automatic pilot systems have not been widely used in light planes and that where they have been used the results have not been altogether satisfactory.

Accordingly, it is one object of the present invention to provide an improved automatic pilot system for dirigible craft.

Another object of the invention is to provide an automatic pilot system employing pneumatic energy throughout both its sensing and power stages.

Another object of the invention is to provide an automatic pilot system with heading memory controls and in which automatic control can be over-ridden manually, the automatic control being reintroduced to achieve the original heading when manual control is relinquished.

Another object of the invention is to provide a reliable, relatively inexpensive automatic pilot system which is low in weight and compact in design.

These and other features and objects of the invention will be understood from the following description of preferred embodiments thereof taken in conjunction with the accompanying drawings, in which.

Figure 1:
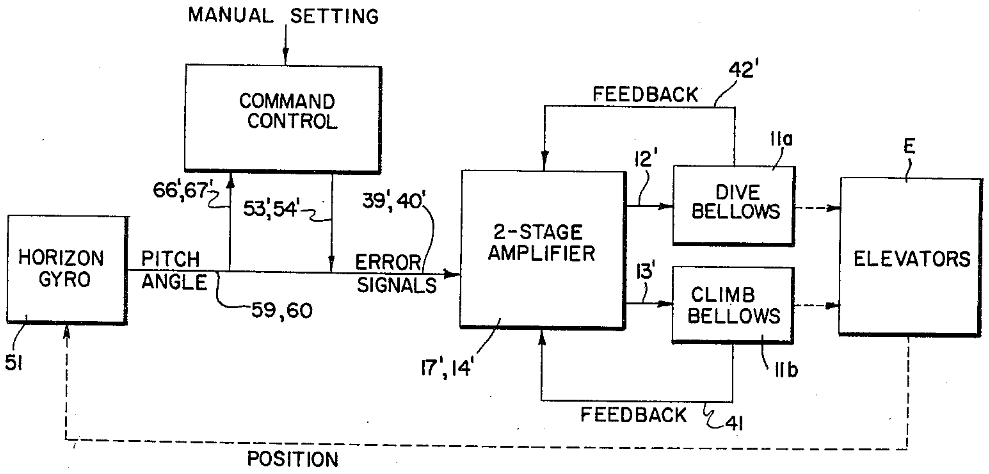
FIGURE 1 is a block flow diagram of the elevator control portion of the automatic pilot.

Referring first to FIGURES 1, 2, and 3A and 3B, there is illustrated in the form of block diagrams (FIGURES 1 and 2) and a simplified schematic diagram (FIGURE 3A) an automatic pilot energized pneumatically throughout and incorporating attitude or pitch, bank or roll, and directional or heading control. The power elements to operate the control surfaces, including the ailerons A and the elevators E, of the airplane take the form of a pair of complementary aileron-actuating bellows **10*a* and 10*b* and a pair of complementary elevator-actuating bellows 11*a* and 11*b*, the bellows working against conventional linkages or cable rigging. The power stages responsive to control signals, which can be derived from instruments or introduced by the pilot and which energize the two sets of bellows 10*a* and 10*b* and 11*a* and 11*b***, are substantially identical, and only one-half of this portion of the entire system need, therefore, be described in detail for a full understanding of the invention. The aileron control portion (FIGURES 2 and 3B) has been selected for description herein, with like parts of the elevator control portion being identified by like, primed reference numerals, where applicable.

Figure 3A:
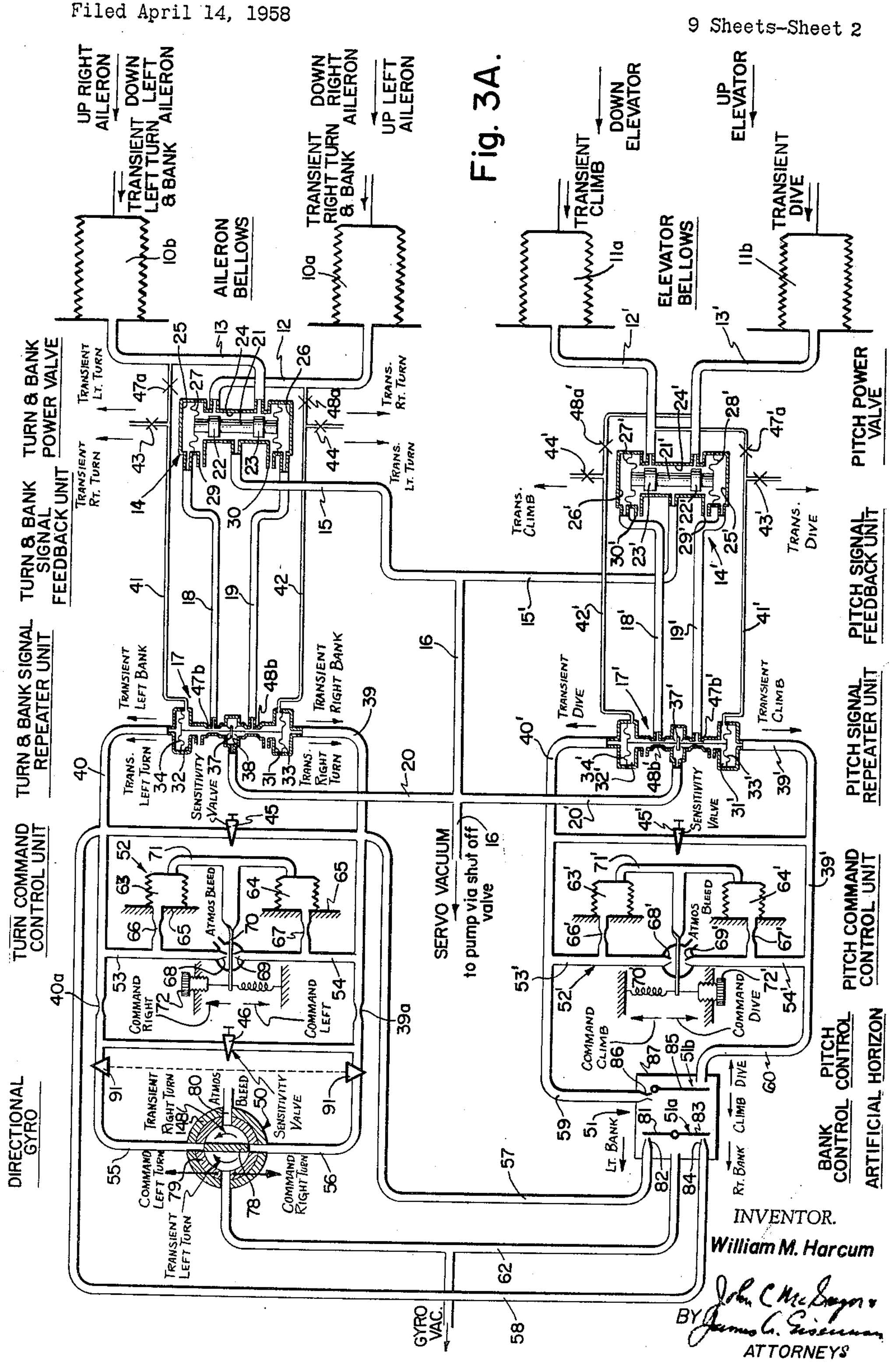
FIGURE 3A is a simplified schematic layout of the automatic pilot showing the pitch, roll and heading control.

Referring primarily to FIGURE 3A, the two aileron bellows **10*a* and 10*b* are respectively coupled by pneumatic conduits 12 and 13 to a pneumatic power amplifier indicated generally by the numeral 14 and adapted to provide differential pressures thereto in response to differential input pressures. The amplifier 14 is coupled to the main source of vacuum of the craft, usually the vacuum pump driven by the main engine, through series-connected conduits 15 and 16. The amplifier 14 is operated by pneumatic signals from a first stage pneumatic amplifier or repeater unit indicated generally by the numeral 17, the connection being via conduits 18 and 19. The amplifier 17 is also coupled to the vacuum source to be energized thereby, this connection taking the form of a conduit 20 connected to the conduit 16** leading to the vacuum pump.

The first stage pneumatic amplifier 17 is described in detail at a later point having reference to FIGURES 4 and 6, as is the amplifier 14, having reference to FIGURES 4 and 5. For purposes of general description at this time, having reference to the schematic diagram of FIGURE 3A, the amplifier 14 includes a valve shaft or spool 21 carrying cylindrical valve elements 22 and 23 and passing through a cylindrical chamber 24 communicating at opposite ends with diaphragm chambers 25 and 26, carrying flexible diaphragms 27 and 28 respectively.

The conduits 18 and 19 communicate with the diaphragm chambers 25 and 26 respectively, and the conduits 12, 13 and 15 communicate with the cylindrical chamber 24 at spaced points along the length thereof, the valve elements 22 and 23 being disposed close to and partly eclipsing the conduits 12 and 13 and the conduit 15 entering the chamber midway between the elements. The chambers 25 and 26 are vented to the atmosphere on the opposite sides of the diaphragms from the conduits 18 and 19 through bleed ducts 29 and 30.

The pneumatic amplifier 17 includes a pair of diaphragm chambers 31 and 32 having flexible diaphragms 33 and 34 respectively. The diaphragms are coupled by a tension member 35 passing through a tubular throat section 36 and carrying at its midpoint a balanced valve element 37 received in a valve chamber 38. The conduit 20, which leads to the vacuum source, is connected to the valve chamber 38. Movement of the valve element 37 upward or downward under the control of differential pressures diverts the flow path between the source conduit 20 and the conduits 18 and 19 leading to the next amplifying stage. Pneumatic signals from the sensing stage to be described below are introduced against the outer surfaces of the diaphragms 33 and 34 by conduits 39 and 40, respectively. The chambers 31 and 32 on the opposite or inner sides of the diaphragms 33 and 34 are connected by force or pressure feedback conduits 41 and 42 to the aileron bellows **10*b* and 10*a*, respectively, through series of constrictions 47*a* and 48*a*. The conduits 41 and 42 are vented to the atmosphere through constrictions 43 and 44, respectively, which together with the constrictions 47*a* and 48*a* form pressure dividing networks so that a portion of the bellows pressure is fed back to the amplifier 17. The feedback conduits 41 and 42 are cross-connected to communicate with the chambers 32 and 31, respectively, so that a portion of the pressure differential which exists between the bellows 10*a* and 10*b* when they are under actuation will be introduced into the repeater unit or first stage amplifier 17** in such a manner that the servo loop is stabilized. The operation of this feedback system, hereinafter called force feedback, will be described more fully below in connection with the discussion of representative operational cycles of the automatic pilot system.

The signals from the sensing stages of the automatic pilot as introduced through the conduits 39 and 40, including constrictions **39*a* and 40*a*, are bridged or shunted on opposite sides of the constrictions by sensitivity adjusting circuits 45 and 46, respectively. The signals are derived from any one of four sources, viz., a directional gyroscope unit 50, an artificial horizon gyroscope 51, a turn command control unit 52, and a pitch command control unit 52' (in the elevator control circuit). The turn command control unit 52 is connected across the conduits 39 and 40 beyond the constrictions 39*a* and 40*a* by means of conduits 53 and 54, and the directional gyroscope 50 is connected across the conduits 39 and 40 on the near side of the constrictions 39*a* and 40*a* by means of conduits 55 and 56, the directional gyroscope thus being connected in parallel with the turn command control unit 52. Also connected across the conduits 39 and 40 and hence in parallel with the directional gyroscope and the turn command control unit is the right and left bank pick-off portion 51*a* of the artificial horizon 51 (positioned in the lower half of FIGURE 3A), this connection being effected by means of conduits 57 and 58. The pitch or climb and dive pick-off section 51*b* of the artificial horizon is connected across the conduits 39' and 40' of the elevator portion of the system by means of conduits 59 and 60. Both the directional gyroscope and the artificial horizon gyroscope are connected to a source of vacuum by conduits 61 and 62**.

Figure 3B:
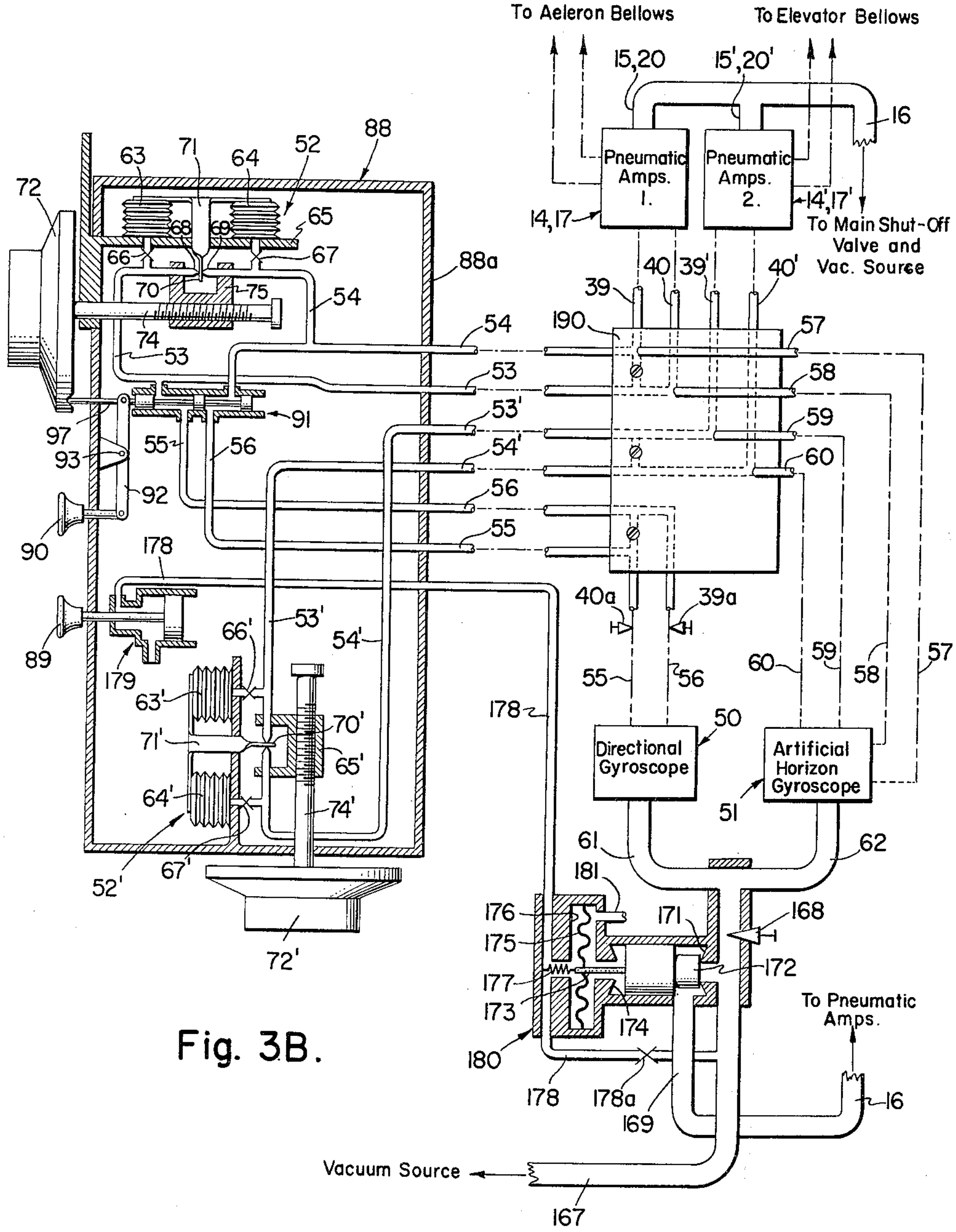
FIGURE 3B is schematic layout based on FIGURE 3A but showing mechanical details of the control units of the automatic pilot.
Figure 9A:
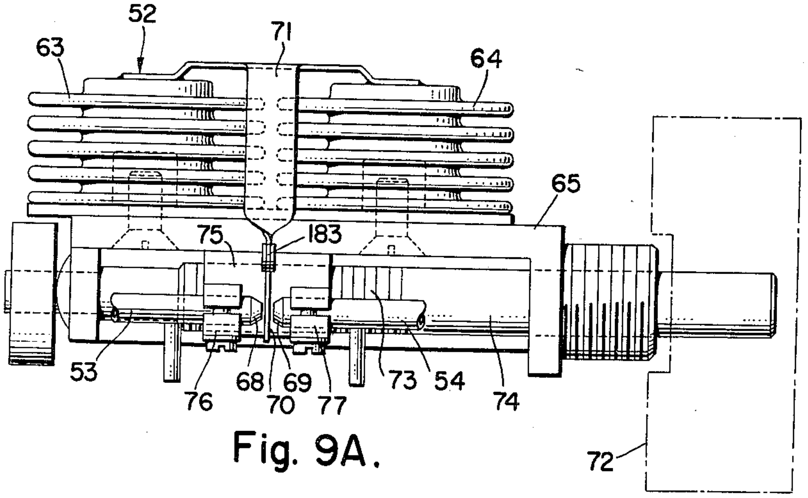
FIGURE 9A is a view in front elevation of a sub-assembly from the control unit of FIGURE 7.
Figure 9B:
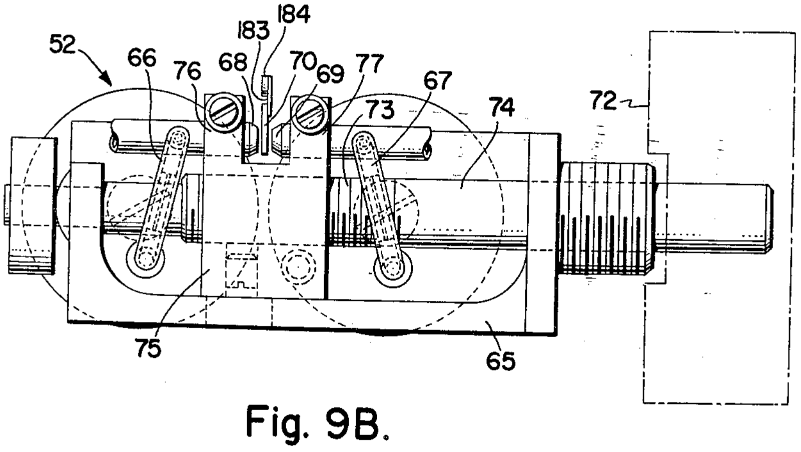
FIGURE 9B is a bottom view of the sub-assembly of FIGURE 8.
Figure 10:
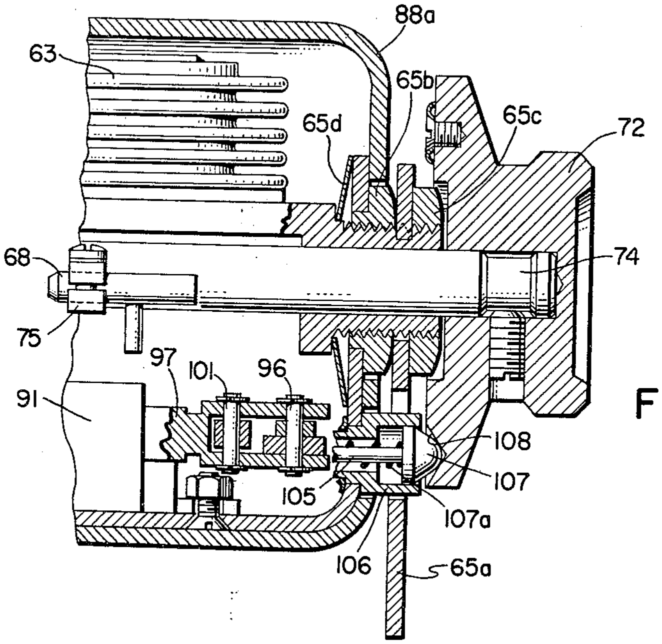
FIGURE 10 is a fragmentary view in vertical section and enlarged scale on the line 10—10 of FIGURE 7 and showing part of the sub-assembly of the command control unit.

The turn command control unit 52, shown diagrammatically in FIGURE 3B and structural details of which are illustrated in FIGURES 9A, 9B and 10, includes a pair of bellows 63 and 64 supported on a common frame or base 65 and coupled respectively to the conduits 53 and 54 by means of constriction conduits 66 and 67 for rate control. The conduits 53 and 54 terminate in constriction nozzles 68 and 69 which vent to the atmosphere. Between the opposed nozzles 68 and 69 is a flapper 70 rigidly supported by a T-shaped bracket assembly 71, the arms of which are respectively secured to the moving ends of the bellows 63 and 64. A change in the relative pneumatic pressures in the bellows will, therefore, cause the flapper 70 to move toward one or the other constriction nozzles 68 and 69 to change the relative air flow into the two nozzles.

Figure 7:
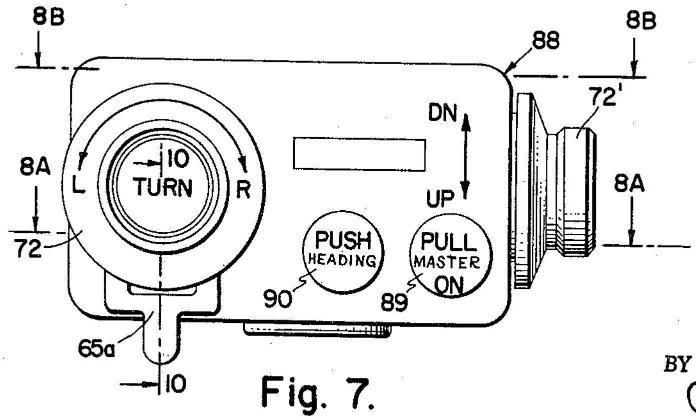
FIGURE 7 is a view in front elevation of the command control unit of the automatic pilot.

Command controls, as opposed to signals from the gyroscope units, are introduced into the turn command control unit 52 by means of a command knob 72 which changes the relative spacing between the flapper 70 and the nozzles 68 and 69. As best seen in FIGURES 9A and 9B, this action is effected by shifting the two nozzles axially under the control of a lead screw 73 on the shaft 74 to which the knob 72 is attached. The shaft 74 is journalled in the frame 65 against axial movement, and its lead screw 73 drives a threaded block 75 to which the two nozzles 68 and 69 are secured by clamps 76 and 77, respectively. Turning the knob 72, therefore, enlarges the distance between one of the nozzles and the flapper, while correspondingly decreasing the distance between the other nozzle and the flapper. The rate regulator conduits 66 and 67 are adapted to yield with this motion, which is extremely small. As best seen in FIGURES 7 and 10 trim adjustments can be made by a lever **65*a* keyed to the frame 65. The frame is normally held frictionally to the casing 88*a* (FIGURE 3B) by washers 65*b* and 65*c* loaded by a spring washer 65*c*. When the shaft 74 is rotated, the frame does not move; when the frame is turned by the lever 65*a*, the shaft does not move (by virtue of a detent 107 described below). The frame, in turning on the screw 73 shifts axially together with the flapper 70 and a differential control at the nozzles 68 and 69** obtains because the nozzles do not move.

The directional gyroscope unit 50, which introduces transient error turn signals as well as command, fixed heading signals, is described in some detail at a later point having reference to FIGURE 13. Insofar as it is shown schematically in FIGURE 3A the directional gyroscope unit includes signal pick-off means including a pneumatic valve assembly having a valve rotor 78 which operates within a stator 79 to which the conduits 55, 56, and 61 are connected at circumferentially spaced points. Also formed in the stator 79 is an atmospheric bleed conduit 80. Movement of the aircraft off its directional course or heading causes the rotor 78 to rotate either in a clockwise or counterclockwise direction as the case may be to couple the vacuum source of the conduit 61 to one or the other conduits 55 and 56, venting the other conduit to the atmosphere. In this fashion, a pressure differential is impressed across the conduits 39 and 40 in the form of an error signal to which the system responds as will be described below. Fixed heading commands can also be introduced from the directional gyroscope in a course selector function by adjustably turning the sleeve 79 relatively to a fixed outer sleeve 148. This results in relative motion between the stator and rotor and turn signals will be introduced into the system to bring the aircraft onto the desired course, thereafter to be held by the transient turn error signals. The setting, being fixed, a memory function is introduced which will cause the aircraft to return to its course setting automatically in the event for any reason manual override control is interposed momentarily by the pilot.

The artificial horizon gyroscope unit 51, certain details of which are described in copending application Serial No. 363,613, filed June 23, 1953, includes, in accordance with conventional practice, a vertical axis gyroscope supported in a gimbal ring assembly affording tilting movement about a first axis aligned with the direction of forward motion of the aircraft and about a second axis passing transversely thereof. Motion of the gimbals about the fore and aft axis is sensed by the right and left bank or roll pick-off 51a (FIGURE 3A), and motion about the transverse axis, representing pitch or climb and dive, sensed by the pick-off 51b. In accordance with the disclosure of said copending application, these pick-offs can take the form of noncoercive cam and nozzle pick-offs in which variations in gaps between the nozzles and cams are sensed as a pressure function. The bank or roll pick-off apparatus 51a operates, accordingly, to change the relative spacing between cam plate 81 and its adjacent nozzle 82 at the end of the conduit 57 and between a cam plate 83 and its adjacent nozzle 84 at the end of the conduit 62. The pitch apparatus 51b includes a cam 85 movable toward and away from the open end of the conduit 60, while the conduit 59 terminates in a constricted opening 86 within a closed housing 87 of the artificial horizon gyroscope unit.

In operation, assuming for purposes of explanation the aircraft is flying on a set course deriving from a predetermined heading setting in the directional gyroscope (angular position of sleeve 79), the aileron bellows 10a and 10b and the elevator bellows 11a and 11b will be in balance, and the control surfaces of the aircraft will be streamlined. It will be assumed first of all that a change in direction or heading to the right occurs as a result, for example, of a transient air current. Turning movement of the aircraft about a vertical axis will be sensed by the directional gyroscope resulting in clockwise movement of the valve rotor 78 causing a source of vacuum to be introduced into the conduit 40 via the conduit 61, the conduit 55 (the end of which is now exposed by the valve action of the rotor 78), and the constriction 40a. At the same time, the mouth of the conduit 56 at the valve of the directional gyroscope will be exposed to the atmospheric bleed 80, this pressure being introduced into the conduit 39 via the constriction 39a. A differential pressure will therefore be exerted across the ends of the repeater or first amplifier stage 17, a higher pneumatic pressure being applied to the underside of the diaphragm 33 than to the top of the diaphragm 34. This results in an upward movement of the valve element 37 tending to introduce vacuum, via the conduits 16 and 20 from the servo vacuum source to the conduit 19. At the same time the source of vacuum to the conduit 18 will be cut down. This results in a pressure differential across the diaphragms 27 and 28 of the power valve or amplifier stage 14, the higher pressure appearing above the diaphragm 27 and the lower pressure below the diaphragm 28, as viewed in FIGURE 3A.

As a result of the differential pressure, the valve spool is driven downward causing the valve element 23 to close off access to the conduit 12 and causing the valve element 22 to more fully expose the mouth of the conduit 13. The source of servo vacuum is thus introduced into the conduit 13 from the source via the conduits 16 and 15, and the valve chamber 24. There results a higher vacuum in the bellows 10b than in the bellows 10a causing the bellows 10b to contract to lower the left aileron and raise the right, the bellows 10a expanding. The aircraft thus moves into a left turn, due to the action of the ailerons and the rudder, which is normally coupled thereto, to correct the transient right turn heading error.

Figure 11:
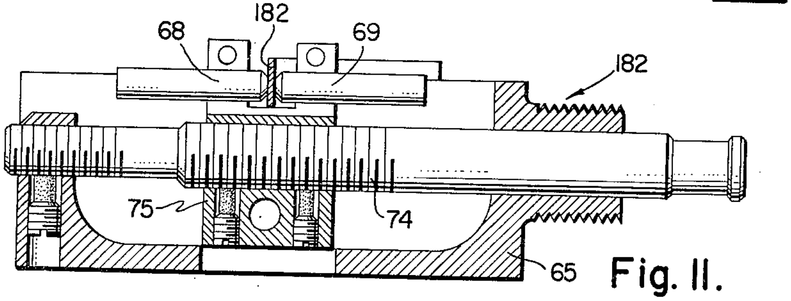
FIGURE 11 is a bottom view corresponding to FIGURE 9B showing a modification of the sub-assembly.

As thus far described in its operation, the automatic pilot derives error signals from the sensing gyroscope instruments to introduce corrections in the flight path of the aircraft. The automatic pilot also includes a fixed heading control, which incorporates a memory function. By adjustably rotating the stator element 79 of the pick-off valve of the directional gyroscope, any desired heading setting can be introduced. If the desired fixed heading differs from the actual flight direction by any angle up to 90°, an error signal will be generated by the pick-off which will, through the same channels described above, turn the plane into the desired heading. The heading will thereafter be maintained by the error signals deriving from the action of the rotor 78. Because the heading setting, once made, remains fixed in the directional gyroscope (the angular position of the stator 79 does not change in the absence of deliberate setting), the pilot is able, in the event he overrides the automatic pilot (by means of manual operation of the conventional controls) to allow the automatic pilot to reassume the preset heading. The specific structural details of the directional gyroscope are described more fully at a later point, having reference to FIGURE 11.

The servo system is stabilized by a force feedback from the bellows 10a and 10b to the repeater or first stage amplifier 17 via the conduits 41 and 42. Recalling in the example described above that bellows 10b is under increased vacuum and bellows 10a is under decreased vacuum, it will be observed that the conduit 41 includes series constriction 47a and a shunt constriction 43, vented to atmosphere. These constrictions function as a pressure divider and a portion of the pressure in the bellows 10b will be introduced below the diaphragm 34. Similarly a portion of the pressure in the bellows 10a will be fed via the conduit 42, including pressure dividing constrictions 44 and 47b, to the repeater unit 17 above the diaphragm 33. The net result is a tendency to balance or stabilize the valve 37 at the instant when the airplane, approaching its correct heading will not require an error signal to be generated in the directional gyroscope unit 50 to complete its maneuver.

Force follow-up control deriving from the cross-connected feedback conduits 41 and 42 is used in accordance with the present invention, in place of positional feedback which, if used, would take the form in accordance with conventional practice of a mechanical linkage coupling from the control surfaces of the aircraft into the pneumatic amplifier stages to bias the valves to effect mechanically compensations broadly similar to those afforded by the pressure or force feedback couplings described above. The use of differential pressure or force feedback from the bellows 10a and 10b affords the servos a follow-up characteristic which is, therefore, independent of positional feedback from the rigging or control surfaces. Not only does this simplify installation of the automatic pilot system, but it eliminates backlash errors and the need for periodic rigging adjustments. The force follow-up will, with a given attitude error signal, trigger a corrective servo force that remains essentially the same regardless of air speed. In contrast, the same error signal in a position follow-up servo may result in too little control surface deflection at low speeds and too much deflection at high speeds.

The response of the automatic pilot to correct an error will vary with the magnitude of the error signal. It will be observed that the command control unit 52 is connected in parallel with the directional gyroscope and with the bank portion of the artificial horizon by the conduits 53 and 54. Initially, the error signal from the gyroscope pick-offs bypass the conduits 53 and 54 and impress themselves directly on the diaphragms of the amplifier unit or first stage amplifier 17. The rate of response is controlled, however, by the action of the rate bellows 63 and 64 in the command control unit 52. A slow error signal in the form, for example, of a higher vacuum in the conduit 40 than in the conduit 39 will cause the bellows 63 to contract while the bellows 64 expands, the pressures effecting this motion being introduced to the bellows through the constrictions 66 and 67. As a result, the flapper 70 is driven downward, as viewed in FIGURE 3B, to close off the atmospheric bleed into the conduit 39 via the constricted orifice 69 of the conduit 54 and to increase the atmospheric bleed to the conduit 41 (presently under higher vacuum) via the constricted nozzle 68 of the conduit 53. The result is controlled attenuation of the original error signal. A fast signal change will momentarily bypass the bellows 63 and 64, this being a function of the time constants of the constrictions 66 and 67, to impose the necessary rapid and forceful compensations on the control surfaces of the aircraft. In this fashion, the servo response is given a phase lead over the actual aircraft displacement. The transient signal components also oppose any tendencies of the system to overshoot the desired correction.

Similarly to the turn error action described above, an error signal from the artificial horizon gyroscope 51, due say to a roll to the left and consequent movement of the cam 81 toward the constriction 82 and movement of the cam 83 away from the constriction 84, will cause a larger proportion of the vacuum (introduced into the artificial horizon housing 87 by the conduit 62) to be introduced into the conduit 58. A pressure differential will occur in the conduits 58 and 57, therefore, which introduces an error signal in the form of decreased pressure in the conduit 40 and increased pressure in the conduit 39. Following the same chain of actions as described above, a correcting motion will be imparted to the ailerons to roll the airplane to the right to correct the error roll to the left.

Assuming now that the plane goes into a dive, the artificial horizon 51 will again be activated to move the cam 85 to the right, tending to cut off the vacuum communication to the conduit 60. This results in a relatively increased vacuum in the conduit 59, introduced via the constriction 86, and a pressure differential is thereby impressed across the conduits 39' and 40', the latter having the lower pressure. This results in an error signal in the form of a differential pressure being impressed across the repeater or first amplifier stage 17' in the same manner as described in the two situations of heading and roll correction described above. The repeater or first stage amplifier 17 and the power or second stage amplifier 14' react to raise the elevators by causing the bellows 11*b* to contract under the force of the servo vacuum. Stabilization is effected through the force feedback coupling of the conduits 41' and 42', as described above.

As thus far described, error signals and command fixed heading signals operate the automatic pilot. The system is also capable of command control under the finger tip manipulation of the pilot through the command control units 52 and 52'. FIGURE 8B is a top view of the complete command control assembly, identified generally by the reference numeral 88. This assembly includes, aligned on different axes, the turn command control unit 52 and the pitch command control unit 52'. The units 52 and 52', one of which is illustrated in detail by FIGURES 9A and 9B, are substantially the same. Turn control is effected through the finger knob 72, preferably arranged in the airplane so that it faces the pilot to be rotated right or left from a neutral, central position. Pitch control is effected through the knob 72', arranged in the plane of the fore and aft axis to be rotated forward or backward from a neutral, central position. Also included in the housing 88 is a master control knob 89 and a heading set knob 90 which controls a valve 91 (FIGURES 3B and 8A) through which the error signals of the directional gyroscope are coupled to the automatic pilot, this valve being interposed in the conduits 55 and 56 to cut the directional gyroscope in and out of the system. Depressing the knob 90 serves to open the valve 91 to cut the directional gyroscope into the system. However, when the pilot undertakes to maneuver the airplane through a command turn by means of the control knob 72, it is necessary that the directional gyroscope be cut out of the system so that there will be no error signal to adversely affect the turn. In accordance with the present invention, therefore, the directional gyroscope is automatically removed from the system when the knob 72 is manipulated.

Figure 8A:
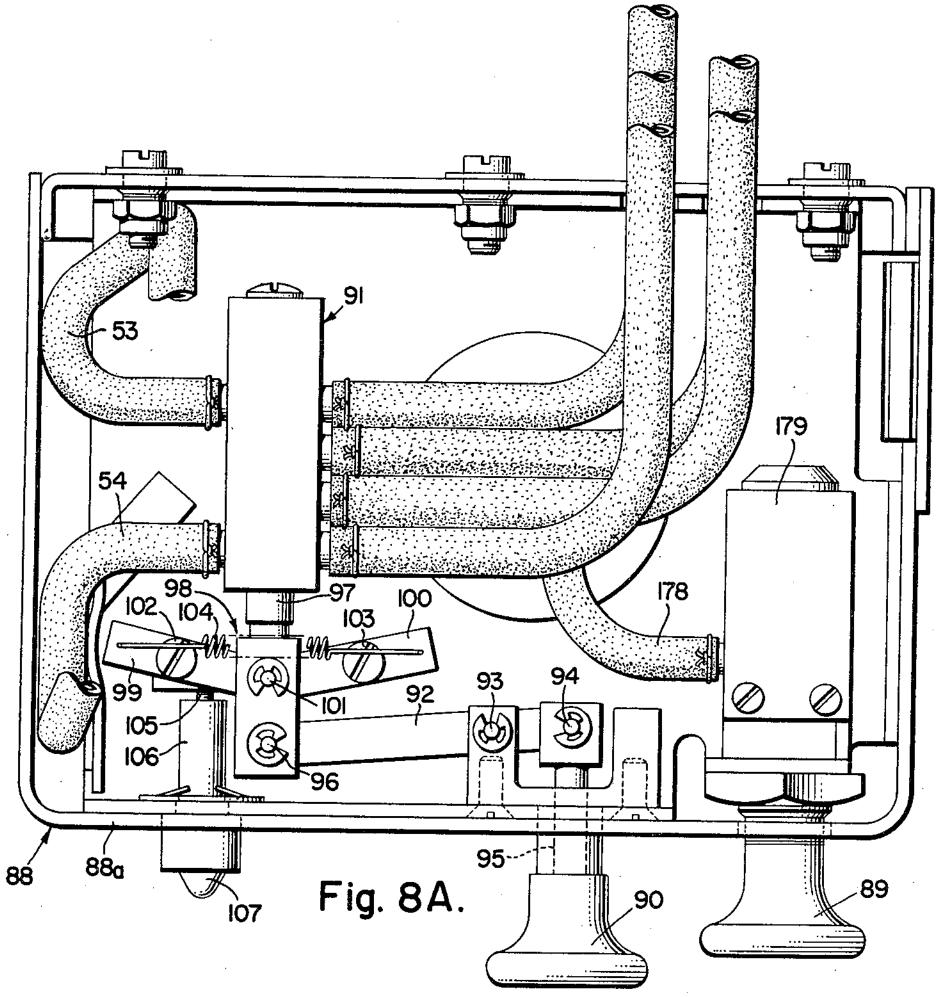
FIGURE 8A is a view in transverse section, in enlarged scale taken on the line 8A—8A of FIGURE 7 looking in the direction of the arrows.
Figure 8B:
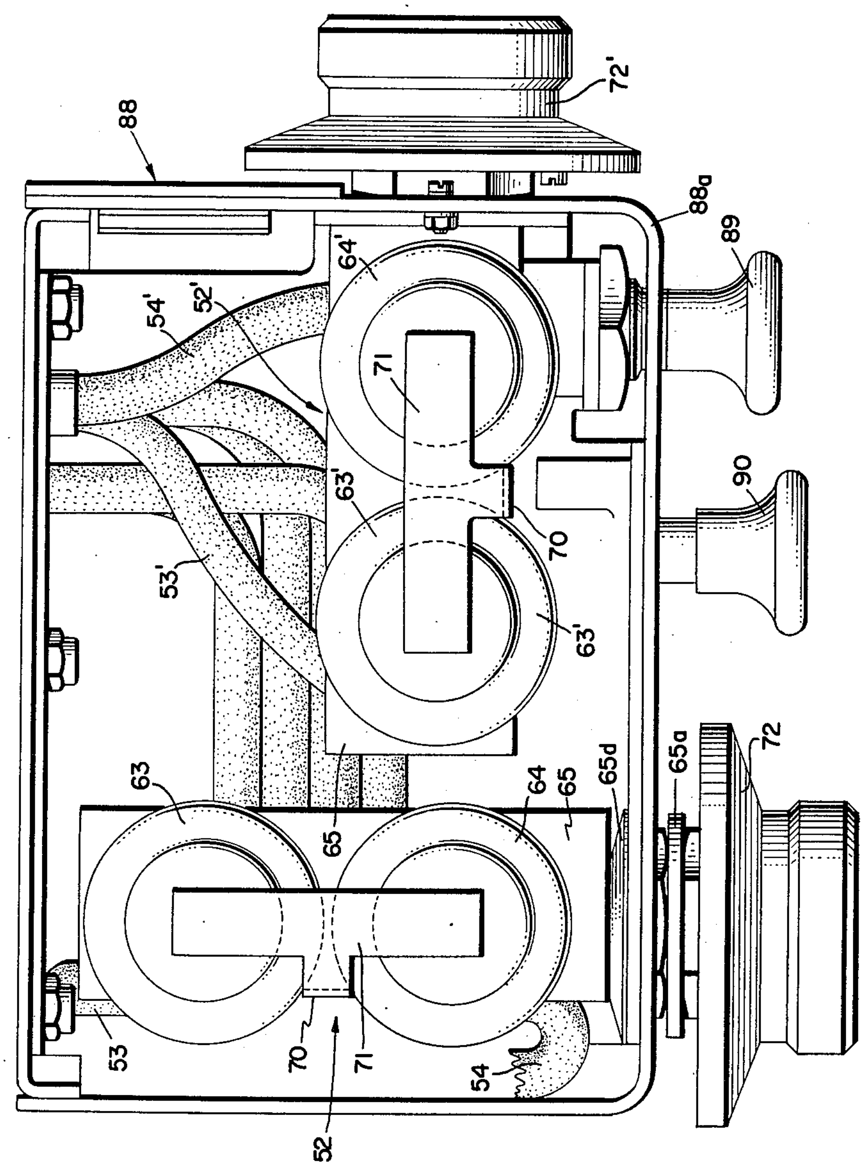
FIGURE 8B is a view in transverse section taken on the line 8B—8B of FIGURE 7 looking in the direction of the arrows.

To this end, as best seen in FIGURES 3B and 8A, a coupling is provided between the knob 90 and the valve 91 including a rocker arm 92 pivoted to the frame at 93 and having its right-hand end pivotally connected at 94 to a push shaft 95 (to which the knob 90 is affixed) and having its other end coupled in a pivotal connection 96 to a valve actuating shaft or stem 97. The valve stem 97 is held, releasably, in its full open or full closed positions by means of an overcentering toggle indicated generally by the numeral 98. The overcentering toggle includes a pair of articulated links 99 and 100, the common center pin 101 of which is pinned to the valve shaft 97. The links 99 and 100 are pivoted to the frame at 102 and 103 respectively and a tension spring 104 reacts between extensions of their outer ends. A push shaft 105 is slidably received in a bushing 106 (see FIGURE 10) carried by the frame of the command control assembly, the pin 105 terminating at its outer end in a detent 107 and at its inner end against the link 99 at a point spaced inwardly of its pivot 102. The detent 107 is urged outwardly by a spring 107*a*. The detent 107 is received in a recess 108 formed in the inner face of the knob 72, the recess being so disposed that the knob is in its neutral or no-command position when the detent is received therein.

In operation of the autopilot, assuming the knob 90 has been depressed and the aircraft is operating automatically under the control of the directional gyroscope and the artificial horizon, attention by the pilot is normally not required. In certain cases, however, it is essential or desirable that the pilot introduce his own command signals through the automatic pilot power system. In such case, the pilot turns the control knob 72 either to the right or to the left, depending on the direction of turn required, whereupon the knob drives the detent 107 inwardly to cause the push shaft 105 to drive the articulated links 99 and 100 of the toggle inwardly to overcenter the toggle and drive the valve stem 97 inwardly to close the valve 91 to cut off the conduits carrying the error signals from the directional gyroscope. The aircraft is now under the control of the pilot and will perform such maneuvers as he might command. To reengage the directional gyroscope, the pilot returns the knob 72 to its central or neutral position and depresses the knob 90 to open the valve 91 to reengage the directional gyroscope at the same time the toggle is overcentered. If the aircraft is at this time not on the heading which has been preset in the directional gyroscope, the automatic pilot will promptly return it to that heading, even though the aircraft might be as much as 90° off course.

The automatic cutout of the heading setting from the directional gyroscope enables the pilot to negotiate a turn through any desired angle without precessing the gyroscope or otherwise compensating for the error signal generated thereby. In the case of the artificial horizon which produces signals in response to pitch and roll, a cutout of the error signals is not required. This is due to the fact that a pitch and roll are brought about by a transient or momentary movement of the control surfaces, the control surfaces becoming streamlined immediately after the desired bank, climb or dive angle has been attained. The controls having become streamlined, no further change in direction of the aircraft occurs, and it is possible to balance the roll and pitch error signals from the artificial horizon 51 by a fixed setting of the command control in the command control unit 52'.

Figure 4:
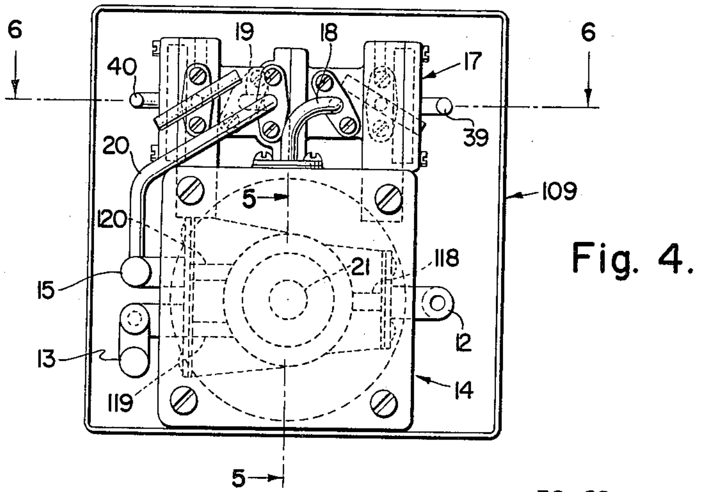
FIGURE 4 is a view in side elevation of a sub-assembly including the first and second pneumatic amplifier stages of the automatic pilot.
Figure 5:
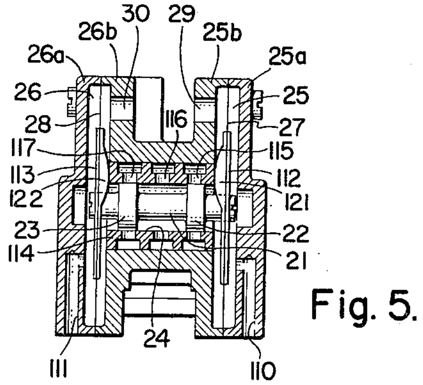
FIGURE 5 is an enlarged view in horizontal section of the second stage pneumatic amplifier or repeater unit of the automatic pilot taken on the line 5—5 of FIGURE 4 looking in the direction of the arrows.

In one preferred embodiment of the invention, the repeater unit or first stage pneumatic amplifier 17 and the power valve or second stage pneumatic amplifier 14 are united in a single assembly as illustrated by FIGURE 4. This assembly, indicated generally by the numeral 109, includes the second or power stage amplifier 14 as its lower portion and the repeater or first stage amplifier 17 at its upper portion. The power amplifier 14 (referring to FIGURES 4 and 5) includes housing parts 25*a* and 25*b* bolted together across the edges of the first circular diaphragm 27 and housing parts 26a and 26b similarly clamping the second diaphragm 28. The housings parts 25a and 26a include ducts 110 and 111, communicating with the space adjacent the outer surfaces of the diaphragms 27 and 28, respectively. The housing parts 25b and 26b include the ducts 29 and 30 which place the space adjacent the inner surfaces of the diaphragms 27 and 28 in communication with the atmosphere to afford an atmospheric bleed. Both diaphragms 27 and 28 include reinforced portions 112 and 113 respectively at their centers and between which the spool or valve stem 21 is secured. The valve chamber 24 is defined by a fitted sleeve element 114 formed with ports 115, 116, and 117, of which the ports 115 and 117 constitute outputs for the vacuum source for the power bellows 10a and 10b and the port 116 constitutes the vacuum source input. The valve elements 23 and 24 normally eclipse in balanced relationship the major area of the ports 115 and 117, but are so arranged on their innermost edges that slight motion of the valve spool to the left or the right fully eclipses one port while opening the other. Preferably, the ports 115, 116 and 117 take the form of circumferential grooves in the outer surface of the spool from which radial bores are drilled at circumferentially spaced points into the valve chamber 24, the connecting ducts 12, 13 and 15 being connected by suitable bores 118, 119 and 120 respectively (FIGURE 4). Centering spring fingers 121 and 122 can be provided on the inner surfaces of the diaphragm 27 and 28 to assist in the centering action of the spool 21 when the pneumatic forces are in balance.

Figure 2:
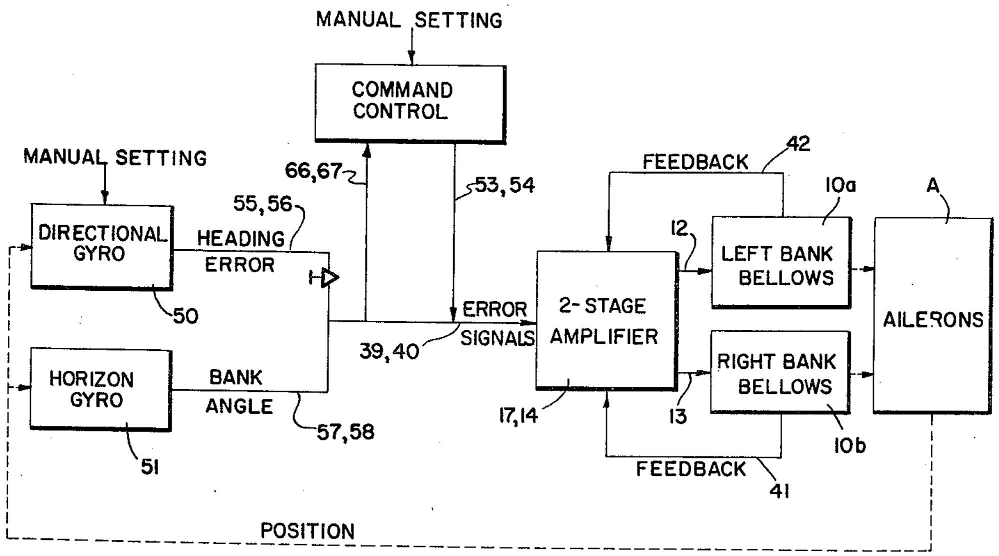
FIGURE 2 is a block flow diagram of the aileron control portion of the automatic pilot.
Figure 6:
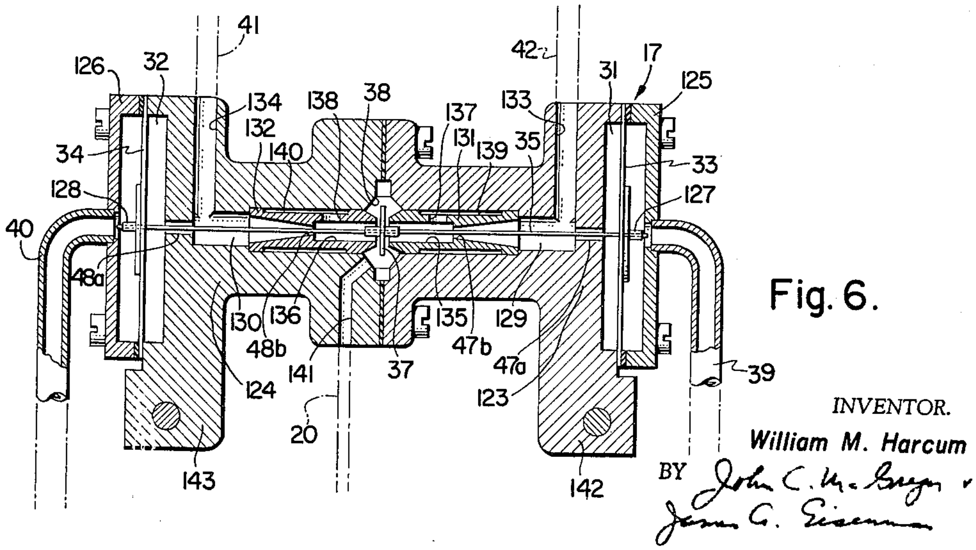
FIGURE 6 is an enlarged view in horizontal section of the first or power amplifying stage of the pneumatic system of the automatic pilot taken on the line 6—6 of FIGURE 4 looking in the direction of the arrows.

Referring now to FIGURES 4 and 6, the repeater unit or first stage amplifier 17 will be described. In FIGURE 6 the unit is illustrated in enlarged scale in horizontal section. As in the case of FIGURE 5, numerals corresponding to those used in the schematic diagrams of FIGURES 1, 2 and 3 are applied to corresponding parts in the assembly drawing. The body of the repeater or amplifier 17 includes a pair of central body portions 123, 124 to opposite ends of which head-caps 125, 126 are bolted to define the cylindrical diaphragm chambers 31 and 32 in which the diaphragms 33 and 34 are respectively secured at their peripheries. The inlet conduits 39 and 40 communicate directly with the spaces on the outer sides of the diaphragms 33 and 34 to impress the differential pneumatic pressure from the sensing portions of the system there-across.

The body portions 123 and 124 define at their centers, where they are bolted together, the central chamber 38 in which the valve element 37, taking the form of a circular disk, is positioned by means of the tension member or wire 35 which is attached by fittings 127 and 128 to the centers of the diaphragms 33 and 34 respectively. The body portions 123 and 124 are formed adjacent the diaphragms 33 and 34 with the pneumatic constrictions 47c and 48c communicating with enlarged inner chambers 129 and 130 respectively. Fitted within these chambers are a pair of constriction and valving sleeves 131 and 132 respectively. The pneumatic constrictions 47b and 48b are formed in the sleeves 131 and 132, and the inner ends of the sleeves extend into the central chamber 38 to points closely adjacent opposite sides of the valve element 37 to establish the balanced valving action described above. The force feedback conduits 41 and 42 communicate with ducts 133 and 134 formed in the body portions 123 and 124, the ducts communicating respectively with the enlarged chambers 129 and 130.

The output signals are taken from cylindrical chambers 135 and 136 in the inner ends of the sleeves 131 and 132, this being accomplished by radial ducts 137 and 138 communicating with circumferential recesses 139 and 140 on the outer surfaces of the sleeves, which recesses are placed respectively in communication with the conduits 18 and 19 (FIGURE 3A) by means of ducts in the body portions 123 and 124 which extend perpendicular to the plane of the paper as seen in FIGURE 6 and which are not, therefore, visible in the figure. The duct 20 (FIGURES 3 and 4) from the vacuum source communicates with the central chamber 38 through a duct 14 formed in the body portion 124. The valve assembly 17 is secured to the valve assembly 14 by means of depending tapped lugs 142 and 143 formed on the body portions 123 and 124, these lugs fitting between the housing parts 25b and 26b of the body of the valve 14. In this fashion, there is provided a highly sensitive repeater unit or first stage amplifier in which differential pneumatic signal pressures introduced via the conduits 39 and 40 cause the valve element 37 to shift to the left or the right to change the balance of pneumatic flow from the conduit 20 and the central chamber 38 to the output ducts 18 and 19. Force feedback signals enter the valve assembly through the ducts 133 and 134.

Figure 13:
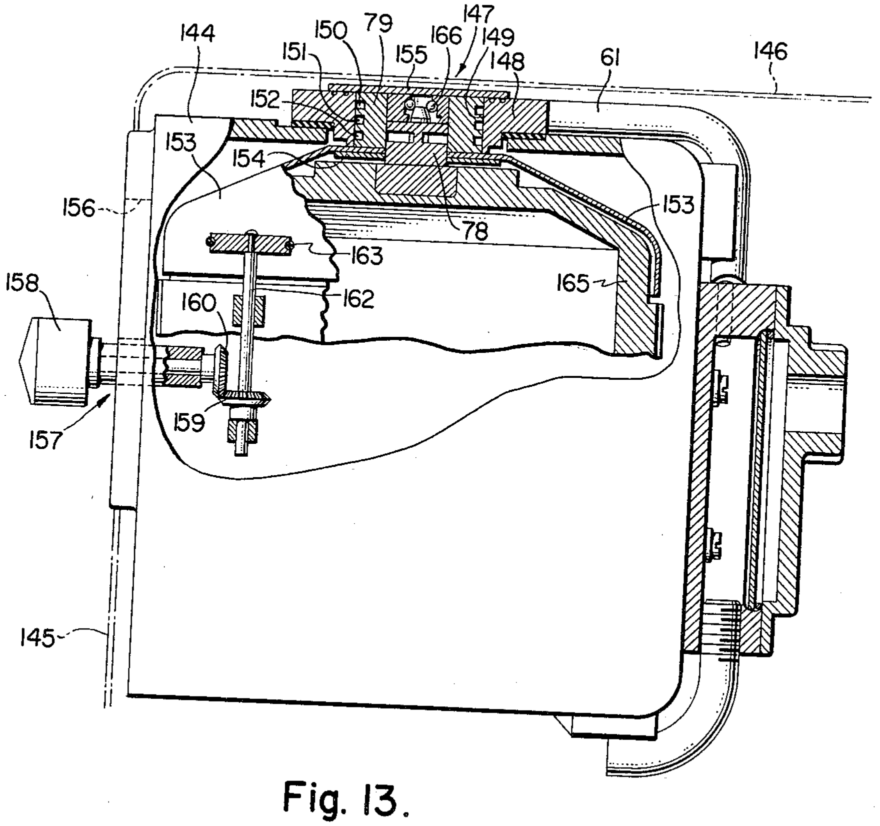

Referring to FIGURE 13, there is illustrated in the form of a fragmentary view in vertical section taken on a stepped line the directional gyroscope component of the automatic pilot. Certain details of this instrument are described and claimed in the copending application Serial No. 728,157, filed April 14, 1958. The housing of the directional gyroscope is indicated by the numeral 144, this housing being fixed to the frame of the airplane behind the instrument panel indicated by the phantom lines 145 and beneath the fore deck indicated by the phantom lines 146. The housing 144 carries on its upper surface a pickoff assembly indicated generally by the numeral 147 and including an outer, fixed ring portion 148 to which three pneumatic conduits (55, 56 and 61, FIGURE 3A) are coupled, only the conduit 61 being visible in FIGURE 11, the others being circumferentially spaced therefrom. The ring portion 148 is formed with a cylindrical opening 149 in its center, within which is mounted for adjusting turning movement the valve stator sleeve 79. The stator 79 is formed with three circumferential grooves or channels 150, 151 and 152 disposed one above the other. The three pneumatic conduits 55, 56 and 61 (FIGURE 3A) are connected respectively to the three grooves by means of radial ducts (not shown) in the fixed ring portion 148. The stator sleeve 79 is secured to a heading indicator card 153 by means of a lower retaining plate 154. The sleeve assembly is completed by an upper retaining plate 155, the assembly being held together by through-bolts (not shown). The stator 151 and the heading indicator card 153 (the readings of which are visible to the pilot through a window 156 in the face of the instrument) are adjustably rotatable as one relatively to the housing 144.

The angular position of the valve stator 151 and the heading card 153 is controlled by heading set mechanism indicated generally by the numeral 157. The heading set mechanism includes a control knob 158 accessible to the pilot, secured to a shaft 159 rotatably supported in the housing of the instrument. The horizontal shaft 159 is coupled by bevel gears 160 and 161 to a vertical shaft 162 also rotatably supported in the housing and carrying on its upper end a drive wheel 163 which frictionally engages the heading card in driving relationship. The entire heading control assembly is disposed on one side of the housing 144 so that the shaft 162 and the drive wheel 163 are disposed in the pocket defined by the rectangular corner of the housing 144 and the adjacent surface of the circular heading card. The pilot by turning the heading knob 158 causes the card 153 to rotate about a vertical axis to display any desired heading in the window 156. The card drives the stator 79 to change the circumferential position thereof relative to the housing 144 and the rotor 78. Circumferentially-spaced radial ducts (not shown) in the stator connect the three circumferential channels 150, 151 and 152 in the outer surface of the stator to its inner surface, the inner ends of the ducts forming parts with respect to which the rotor 78 moves to effect its valving action. The rotor is affixed to the casing 165 of the gyroscope along the vertical axis of rotation and is incorporated in a bearing assembly 166 held by the retaining plate 155. In accordance with conventional practice, the gyroscope unit is mounted within the casing 165 within an inner gimbal, the casing forming the outer gimbal. The mounting is such that any change in direction of the heading of the aircraft relative thereto will cause the gyroscope casing 165 and the valve rotor 78 coupled thereto to turn within the stator 151 to unbalance the pneumatic system in the manner described above.

In the event the pilot manually overrides the automatic pilot control of the aircraft by exerting force on the conventional control members, the directional gyroscope will retain, in a memory function, the original heading setting so that when the controls are released, the aircraft will assume the indicated course or heading. In the event the pilot introduces a command turn right or left by means of knob 72 on the turn command control unit 52 (FIGURES 3 and 7–10 inclusive) the conduits 55 and 56 from the directional gyroscope will be shut off from the automatic pilot system by means of the automatic detent linkage of FIGURE 10. Control of the aircraft is now effected through the knob 72 using the power system of the automatic pilot. In the event the pilot wishes to reintroduce the heading setting of the directional gyroscope, he simply turns the knob 72 to its neutral position and depresses the knob 90 to recouple the directional gyroscope to the system. The directional gyroscope will then furnish an error signal, if the plane is off its course, to bring it into the original heading.

Figure 12:
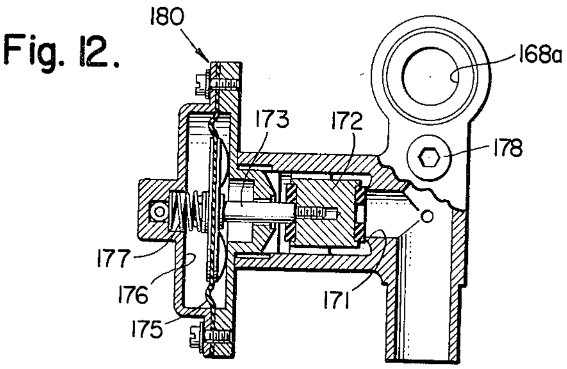
FIGURE 12 is an enlarged view in horizontal section showing the main shut-off valve for the pneumatic system; and, FIGURE 13 is a fragmentary view in vertical section of the directional gyroscope including the pneumatic pick-off and heading setting adjustment.

Referring to FIGURE 12 there is illustrated a main shut-off valve assembly 180 for controlling the pneumatic supply to the gyroscopes and to the automatic pilot. The valve assembly includes a vacuum inlet conduit 167 adapted to be connected to the ship's supply and a first pair of outlet conduits 61 and 62 respectively comprising the suction conduits to the gyroscopes 50 and 51. A valve 168 is provided to control the flow. Other valves (not shown) at the gyroscope units are used to start and stop the gyroscopes. A T-connection from the main supply conduit 167 terminates in a valve seat 171 against which a valve element 172 rests. An output conduit 16 leading to the pneumatic amplifiers of the automatic pilot is thereby sealed off from the vacuum source. A valve stem 173 is coupled through a second valve seat 174 to the center of a diaphragm 175 mounted in a closed chamber 176 and a coil spring 177 urges the diaphragm and valve element 172 toward the valve seat 171. Normally, the suction in the conduit 167 cooperates in holding the valve element 172 on its seat. Forces to move the valve element 172 from its seat 171 are provided by a small shunt conduit 178 tapped into supply conduit 167 and coupled to the left hand side of the chamber 176 as viewed in the drawing. The conduit 178 includes a constriction 178*a*. The conduit 178 extends from the remote location of the valve assembly 180 to the command control unit 88 (see FIGURE 3B), normally located on the panel board before the pilot. The conduit 178 terminates in the unit 88 in a valve unit 179 which is actuated by the finger knob 89. The valve 179 is a control valve unit which selectively vents the conduit 178 to atmosphere or seals it from the atmosphere under the control of the finger knob 89. When the valve 179 is venting to the asmosphere, as shown in FIGURE 3B, atmospheric pressure will be impressed on the left hand side of the diaphragm 175 of the power valve assembly 180 and the combination of the pressure of the spring 177 (FIGURE 12) and the suction in conduit 167 holds the valve element 172 on its seat 171. The relatively small leakage through the constriction 178 will not significantly influence the pressure on the diaphragm. To open the valve 180, thereby energizing the pneumatic amplifiers 14, 17 and 14′, 17′, the pilot actuates the knob 89 to seal off the conduit 178 from atmosphere. Immediately a vacuum begins building in the chamber 176 through the constriction 178*a* and the diaphragm, which is relatively large in area, pulls the valve element 172 from its seat to expose the pneumatic amplifiers to the vacuum source of the conduit 167. The valve element preferably back seats against the second seat 174 to prevent leakage via an atmospheric vent 181 on the right hand side of the diaphragm. The valve remains in this status until the pilot presses the knob 89 to vent the conduit 178 to atmosphere to reduce the holding vacuum on the diaphragm to allow the spring 177 to urge the element 172 against its first seat 171. In this fashion the power valve is actuated remotely through a completely pneumatic system. In addition to other co-pending applications to which reference has been made above, reference is also made to the following co-pending applications disclosing claiming certain components and sub-assemblies of the complete automatic pilot system disclosed herein: Serial No. 728,151, filed April 14, 1958, in the name of Walter M. Templin, entitled "Automatic Pilot," now Patent Number 3,044,490, Serial No. 728,409, filed April 14, 1958, in the name of Elwood M. Hunt, entitled "Control Assembly for Automatic Pilot"; Serial No. 728,168, filed April 14, 1958, in the names of William M. Harcum and Walter M. Templin, entitled "Command Control Unit for Automatic Pilot," now abandoned; and Serial No. 728,-408, filed April 14, 1958, in the names of William M. Harcum and Edward D. Watson, entitled "Pneumatic Repeater Unit for Automatic Pilot," now Patent Number 3,003,513.

While the invention has been described above having specific reference to the illustrated preferred embodiment thereof, it will be understood that various changes and modifications can be made in the system and the several component parts thereof. Thus, for example, if it is desired to provide a system in which the rate function introduced by the bellows 63 and 64 in the command control is not provided, control units in accordance with the arrangment of FIGURE 11 can be used. This unit, identified generally by the numeral 182 is substituted directly for the unit 52 (or 52′). The unit 182, in which parts corresponding directly to those of the unit 52 are identified by like, primed reference numerals, includes a lead screw 74 which, when turned, as by a knob 72, drives a threaded block 75 to and fro. The block 75 carries the opposed pneumatic nozzles 68 and 69 in inverse motion relatively to the flapper 182 (corresponding to the flapper 70 of the unit 52). The flapper 182 is, however, fixed to the frame 165 and does not move as a function of change of signal pressure in the control system. When a moving flapper arrangement is used, as in the case of the flapper 70 of FIGURES 9A and 9B, damping of flapper can be effected by affixing a side arm 183 to the flapper and hanging from the side arm a short, flexible strip 184 carrying a small weight (not shown) at its depending or free end.

Other modifications and changes in the automatic pilot will suggest themselves to those skilled in the art having reference to this specification. The invention should not, therefore, be regarded as limited except as defined in the following claims.

I claim:

1. In an automatic pilot for dirigible craft, means to afford input signals representative of a change in flight conditions, a source of pneumatic energy, first pneumatic amplifier means energized by the source and responsive to the input signals to afford differential output pressures, second pneumatic amplifier means comprising a balanced power valve responsive to the output of the first pneumatic amplifier, pneumatic power responsive to the second pneumatic amplifier means to effect steering control of the craft, pnueumatic output conduits connected between the second pneumatic amplifier means and the power members whereby the latter are differentially energized as a function of the input signals, and pressure feedback conduits connected between the first pneumatic amplifier and the pneumatic output conduits to introduce therein pneumatic pressures which are a function of the output pressures, whereby the pressure differentials impressed on the power members are at least partially offset.

2. Apparatus as set forth in claim 1, said feedback conduits each including pneumatic restrictions.

3. Apparatus as set forth in claim 2, said pneumatic restrictions in each conduit including series and parallel restrictions to afford a pressure dividing network.

4. In an automatic pilot for dirigible craft, input control means including at least a pair of pneumatic input conduits to receive pneumatic signals representative of a change in flight conditions, and rate bellows means connected across the input conduits to respond to pressure differentials thereon to attenuate the pressure differential at a predetermined rate, said bellows means comprising a pair of bellows connected respectively to the two input conduits, pneumatic rate constrictions in the respective connections, and valve means responsive to differential movement of the bellows to attenuate the pneumatic signal in the input conduits.

5. Apparatus as set forth in claim 4, said valve means including a pair of opposed pneumatic bleed vents connected respectively to the two conduits and a flapper connected to the two bellows and movable between the bleed vents in response to differential movement of the bellows to change the relative flow in the two bleed vents in inverse proportion, thereby to attenuate the pressure difference between the two input conduits.

6. Apparatus as set forth in claim 5 including manual command control means to effect relative movement between the bleed vents and the flapper to introduce error signals into the input conduits, thereby to effect command control of the craft through the pneumatic amplifier system of the automatic pilot.

7. Apparatus as set forth in claim 6, said manual command control means including means to shift said bleed vents in translation.

8. In an automatic pilot for dirigible craft having elevator and aileron controls, a pneumatically-energized directional gyroscope and a pneumatically-energized artificial horizon gyroscope, pneumatic pick-off means on the directional gyroscope to afford pneumatic error signals representative of departure of the craft from its predetermined heading, first and second pneumatic pick-off means on said artificial horizon gyroscope to afford first error signals representative of roll of the craft and second error signals representative of pitch of the craft, a first pair of pneumatic power bellows for actuating the elevator controls of the craft and a second pair of pneumatic power bellows for actuating the ailerons of the craft, a first pneumatic amplifier system including a pair of input signal conduits for receiving the error signals from the directional gyroscope and for receiving the first error signals from the artificial horizon, a second pneumatic system including a pair of input conduits for receiving pneumatic error signals from the pitch pick-off of the artificial horizon, said pneumatic systems each including a first amplifier stage, and a second amplifier stage responsive thereto comprising a valve chamber to be connected to a source of pneumatic energy, a pair of output conduits connected to the pair of power bellows, a balanced valve element in the chamber for controlling the relative flow of pneumatic energy to the two power bellows, a pair of diaphragm chambers flanking the valve chamber and each having a diaphragm therein, means to connect the input conduits to the respective diaphragm chambers on one side of the diaphragms therein, and means to connect the valve elements to move with the diaphragms, said feedback conduits being cross-coupled from the power bellows to the diaphragm chambers on the opposite sides from the input conduits, whereby the pressure differential introduced into the power bellows is offset after actuation of the control surfaces of the craft.

9. Apparatus as set forth in claim 8, including first and second rate-adjusting means connected respectively across the two pairs of input conduits of the two pneumatic systems and each comprising a pair of rate bellows connected respectively to the pair of conduits, rate regulating pneumatic construction in said rate adjusting means, and valve means responsive to differential movement of said bellows to attenuate the error signal in the input conduits.

10. Apparatus as set forth in claim 9, including command control means for introducing pneumatic error signals to the input conduits, said command control means comprising manual means to actuate said valve means to change the relative pneumatic pressures in the input conduits.

11. Apparatus as set forth in claim 8, said feedback conduits being connected to the first amplifier stage to reduce the pressure differential impressed across the diaphragms of the second amplifier stage.

12. In a pneumatically-powered automatic pilot for dirigible craft, input signal means to afford pneumatic pressure differentials which vary as a function of a desired control action, said input signal means including sensing means responsive to movement of the craft abnormal to its desired motion, manual control means for the craft connected across the sensing means to afford pressure differentials, a first pneumatic amplifier including closed chamber means, diaphragm means therein, input conduit means to impress the signals across the diaphragm means, a source of pneumatic energy, movable member means to be driven by the pneumatic energy, a power chamber in the amplifier connected to the source, a pair of conduit means connecting the power chamber at spaced points to exert pneumatic forces on the movable member means, a balanced valve element, in the power chamber to divide the pneumatic energy flow between the conduit means to the movable member means, and means to couple the diaphragm means to the valve element to control the ratio of pressures in the conduit means.

13. Apparatus as set forth in claim 12, including a second pneumatic amplifier, said movable member means connected to receive the output of said first pneumatic amplifier comprising input diaphragm means in the second pneumatic amplifier, and valve means controlled by the input diaphragm means to control a flow of pneumatic energy between a source of pneumatic energy and steering means for the dirigible craft.

14. Apparatus as set forth in claim 12, the dirigible craft including movable control surfaces for directing the craft, a pair of power bellows to drive the control surfaces, and a pair of pneumatic feedback conduits connecting the pressure in the respective bellows back to the first pneumatic amplifier on opposite sides of the valve element therein, thereby to stabilize the system.

15. Apparatus as set forth in claim 14, including a second pneumatic amplifier interposed between the first pneumatic amplifier and the power bellows.

16. Apparatus as set forth in claim 14, including pneumatic constrictions between the valve chamber and each of the points of connection of the feedback conduits thereto.

17. Apparatus as set forth in claim 14, including atmospheric bleed constrictions in each of the feedback conduits.

18. Apparatus as set forth in claim 14, said closed chamber means and said diaphragm means comprising two closed chambers and two diaphragms disposed respectively therein, and pneumatic constrictions placing the respective feedback conduits in communication with the respective diaphragms on opposite sides thereof from the introduction of the input signals.

(References on following page)

References Cited in the file of this patent

UNITED STATES PATENTS

| | | |
|---|---|---|
| 2,146,176 | Donaldson | Feb. 7, 1939 |
| 2,210,916 | Kenyon et al. | Aug. 13, 1940 |
| 2,210,917 | Kenyon et al. | Aug. 13, 1940 |
| 2,373,315 | Kenyon | Apr. 10, 1945 |
| 2,445,335 | Philbrick et al. | July 20, 1948 |
| 2,525,038 | Kutzler | Oct. 10, 1950 |
| 2,709,421 | Avery | May 31, 1955 |
| 2,738,772 | Richter | Mar. 10, 1956 |
| 2,790,612 | Kenyon | Apr. 30, 1957 |
| 2,836,196 | Gunn | May 27, 1958 |
| 2,866,611 | Thompson | Dec. 30, 1958 |

FOREIGN PATENTS

| | | |
|---|---|---|
| 549,105 | Great Britain | Nov. 6, 1942 |